(No Model.)
R. W. SISE.
CHAIN CLEANING ATTACHMENT.
No. 604,429. Patented May 24, 1898.
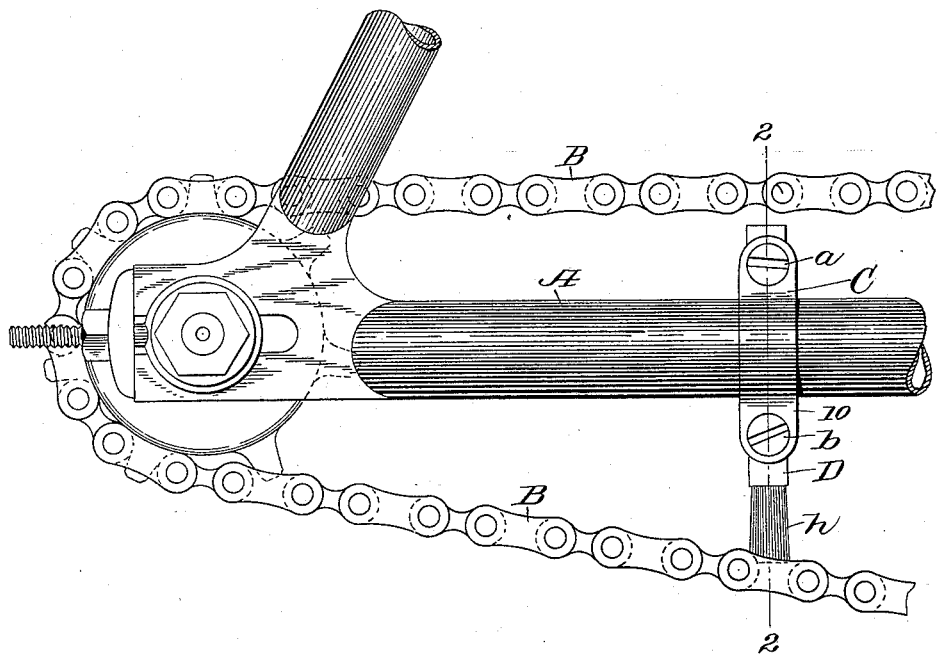
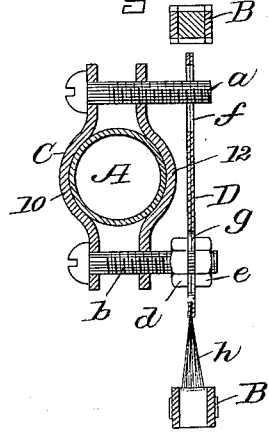
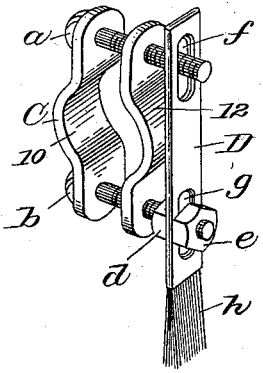
WITNESSES
INVENTOR
Robert W. Sise
by Teschemacher
Atty.

UNITED STATES PATENT OFFICE.

ROBERT W. SISE, OF MEDFORD, MASSACHUSETTS.

CHAIN-CLEANING ATTACHMENT.

SPECIFICATION forming part of Letters Patent No. 604,429, dated May 24, 1898.

Application filed October 7, 1897. Serial No. 654,412. (No model.)

*To all whom it may concern:*

Be it known that I, ROBERT W. SISE, a citizen of the United States, residing at Medford, in the county of Middlesex and State of Massachusetts, have invented an Automatic Chain-Cleaning and Lubricant-Distributing Attachment for Bicycles, of which the following is a full, clear, and exact description, reference being had to the accompanying drawings, making part of this specification, in which—

Figure 1 is a side elevation of a portion of a bicycle having my attachment applied thereto. Fig. 2 is a vertical section on the line 2 2 of Fig. 1. Fig. 3 is a perspective view of my device.

Much trouble is experienced by bicycle-riders from the clogging of the chain by the dust collected by the lubricant, which necessitates the frequent cleaning and relubricating of the chain, another source of annoyance being the working away of the lubricant from the bearing-surfaces of the chain and the difficulty of properly regulating the amount of lubricant used upon the same. To overcome these difficulties is the object of my invention, which consists in the combination, with a bicycle-frame, of a brush secured thereto and arranged to engage the chain, whereby the latter is kept free from dirt while in use and the lubricant at the same time evenly and uniformly distributed and kept in contact with the bearing-surfaces of the chain, as hereinafter more fully set forth.

In the said drawings, A represents a portion of the lower bar of a bicycle-frame, and B the chain, both of the usual construction.

C is a clamp composed of two pieces 10 12, adapted to partially or wholly encircle the bar A, to which they are secured by screws $a\ b$, passing through suitable holes at the upper and lower ends of the said pieces. The holes in the inner piece 12 are threaded to fit the screws, while the holes in the outer piece 10 are of sufficient diameter to permit said piece to slide over the threads of the screws when necessary to adjust its position with respect to the portion 12. Over the end of the lower screw $b$, which extends inward beyond the portion 12 of the clamp, are screwed two nuts $d\ e$, between which is firmly secured a flat vertical bar or holder D, provided with slots $f\ g$ to enable it to fit over the screws $a\ b$, the screw $a$ serving as a guide to prevent the bar D from swinging laterally on the screw $b$, and thus keeping it in its proper vertical position while it is clamped between the nuts $d\ e$. To the lower end of the holder D is secured a brush $h$, which is arranged, as shown in Fig. 1, to engage the chain B as the latter moves in contact therewith when the bicycle is in use, said brush thus serving to automatically clean the chain and prevent the same from becoming clogged by the dirt collected by the lubricant used and at the same time uniformly and evenly distributing the lubricant in such manner as to keep it at all times in contact with the bearing-surfaces of the chain, advantages which will be readily appreciated by all bicycle-riders.

The holder or bar D, as shown in Figs. 2 and 3, is formed by folding a piece of sheet metal longitudinally upon itself, and the bristles forming brush $h$ are clamped in place in the end of the holder by such folding.

When either one of the nuts $d$ or $e$ is loosened, the slots $f\ g$ permit the brush-holder D to be adjusted vertically to enable the brush to properly engage the chain, and by varying the position of the nuts lengthwise upon the screw the brush can be adjusted laterally to bring it exactly over the center of the chain, as required to produce the best results.

Instead of arranging the brush to extend downward from the clamp C to engage the portion of the chain beneath the bar A it is obvious that it may be arranged to extend upward and engage that portion of the chain above the bar A with equally good results.

What I claim as my invention, and desire to secure by Letters Patent, is—

The combination with a clamp adapted to the lower frame-bar of a bicycle and having two horizontal attaching-screws, the threaded ends of which project beyond the clamp, of a vertically-disposed plate or bar slotted to receive said projecting screw ends and vertically adjustable thereon; said plate or bar having a brush on one end, and nuts on said screws at opposite sides of the bar or plate, substantially as described.

Witness my hand this 4th day of October, A. D. 1897.

ROBERT W. SISE.

In presence of—
P. E. TESCHEMACHER,
B. L. MARDEN.